United States Patent [19]
Ferguson et al.

[11] Patent Number: 5,780,806
[45] Date of Patent: Jul. 14, 1998

[54] LASER ABLATION SYSTEM, AND METHOD OF DECONTAMINATING SURFACES

[75] Inventors: Russell L. Ferguson, Idaho Falls, Id.; Martin C. Edelson; Ho-ming Pang, both of Ames, Iowa

[73] Assignee: Lockheed Idaho Technologies Company, Idaho Falls, Id.

[21] Appl. No.: 506,585

[22] Filed: Jul. 25, 1995

[51] Int. Cl.⁶ .................... B23K 26/00; B23K 26/16
[52] U.S. Cl. .................. 219/121.68; 134/1; 219/121.69
[58] Field of Search ............... 219/121.84, 121.68, 219/121.69, 121.83, 121.76, 121.65, 121.66, 121.78, 121.8, 121.72; 134/1

[56] References Cited

U.S. PATENT DOCUMENTS

| | | | |
|---|---|---|---|
| 4,261,764 | 4/1981 | Narayan | 219/121.6 |
| 4,292,093 | 9/1981 | Ownby et al. | 148/512 |
| 4,665,529 | 5/1987 | Baer et al. | 372/107 |
| 4,701,592 | 10/1987 | Cheung | 219/121.65 |
| 4,720,621 | 1/1988 | Langen | 219/121.68 |
| 4,761,786 | 8/1988 | Baer | 372/13 |
| 4,799,755 | 1/1989 | Jones | 219/121.6 |
| 4,844,574 | 7/1989 | Chande | 219/121.6 |
| 4,870,246 | 9/1989 | Bisiach | 219/121.78 |
| 4,898,650 | 2/1990 | Wu et al. | 134/1 |
| 4,945,489 | 7/1990 | Vahab | 219/121.78 |
| 5,057,664 | 10/1991 | Johnson et al. | 219/121.69 |
| 5,059,764 | 10/1991 | Baer | 219/121.68 |
| 5,140,128 | 8/1992 | Jones et al. | 219/121.72 |
| 5,151,134 | 9/1992 | Boquillon et al. | 134/1 |
| 5,362,941 | 11/1994 | Johnson et al. | 219/121.84 |
| 5,466,908 | 11/1995 | Hosoya et al. | 219/121.68 |
| 5,538,764 | 7/1996 | Li et al. | 427/554 |

FOREIGN PATENT DOCUMENTS

| | | | |
|---|---|---|---|
| 0091646 | 10/1983 | European Pat. Off. | |
| 507268 | 10/1992 | European Pat. Off. | |
| 642846 | 3/1995 | European Pat. Off. | |
| 2-99293 | 4/1990 | Japan | 219/121.84 |
| 3-47692 | 2/1991 | Japan | 219/121.84 |
| 4-339587 | 11/1992 | Japan | |
| 95-13618 | 5/1995 | WIPO | |

OTHER PUBLICATIONS

Translation of Japan Patent document 4-339,587, PTO 97-2624, Apr. 1997.

*Decontamination Development Program*, lecture given at Waste Management Education and Research Consortium (WERC) Conference, Las Cruces, NM, Apr. 13-15, 1994, proceedings published Jul. 25, 1994.

*Light Ablation for Decontamination*, lecture given at The Minerals, Metals & Materials Society meeting.

Primary Examiner—Geoffrey S. Evans
Attorney, Agent, or Firm—Well St John Roberts Gregory & Matkin

[57] ABSTRACT

A laser ablation system comprising a laser head providing a laser output; a flexible fiber optic cable optically coupled to the laser output and transmitting laser light; an output optics assembly including a nozzle through which laser light passes; an exhaust tube in communication with the nozzle; and a blower generating a vacuum on the exhaust tube. A method of decontaminating a surface comprising the following steps: providing an acousto-optic, Q-switched Nd:YAG laser light ablation system having a fiber optically coupled output optics assembly; and operating the laser light ablation system to produce an irradiance greater than $1\times10^7$ W/cm², and a pulse width between 80 and 170 ns.

49 Claims, 4 Drawing Sheets

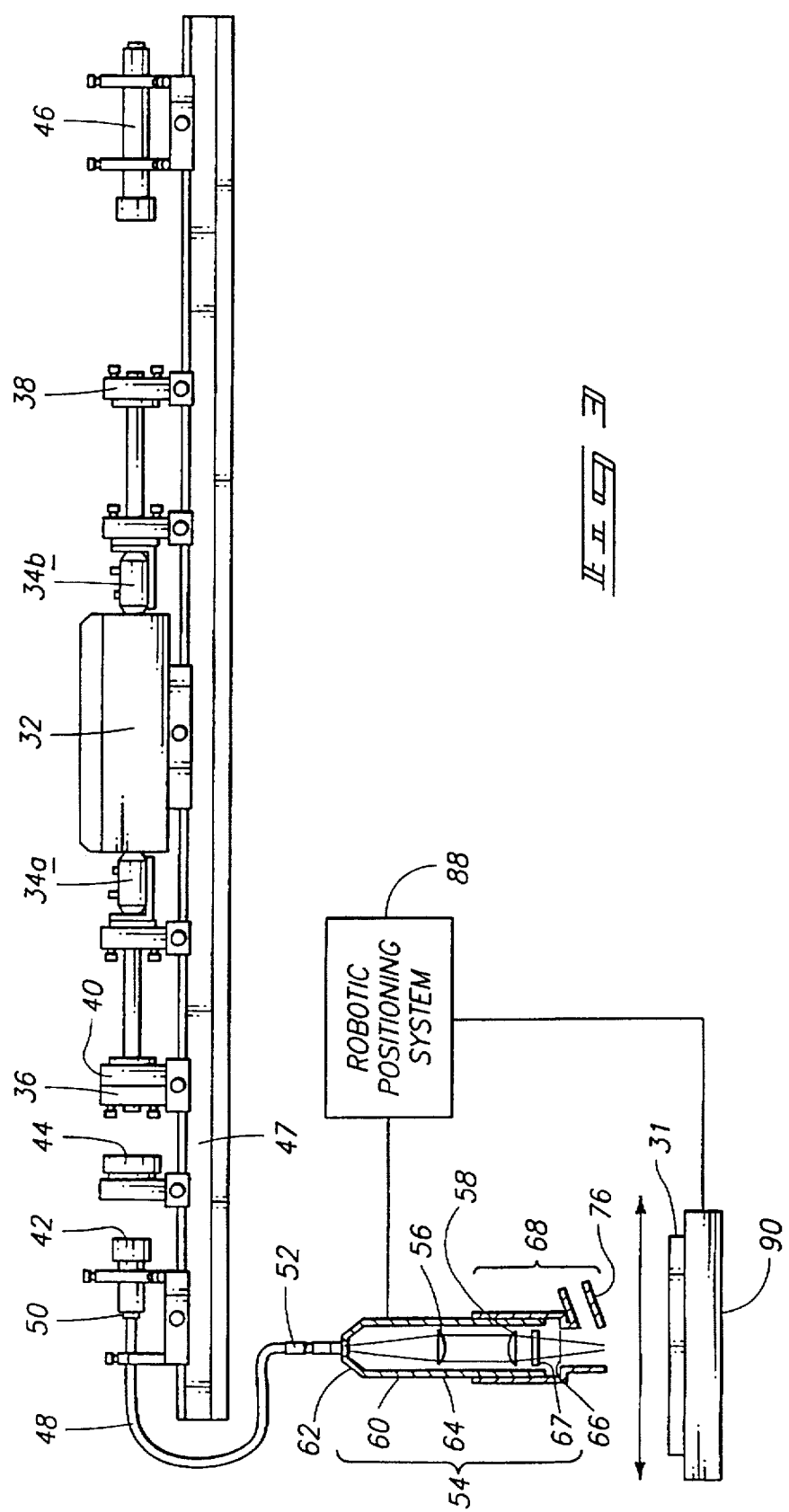

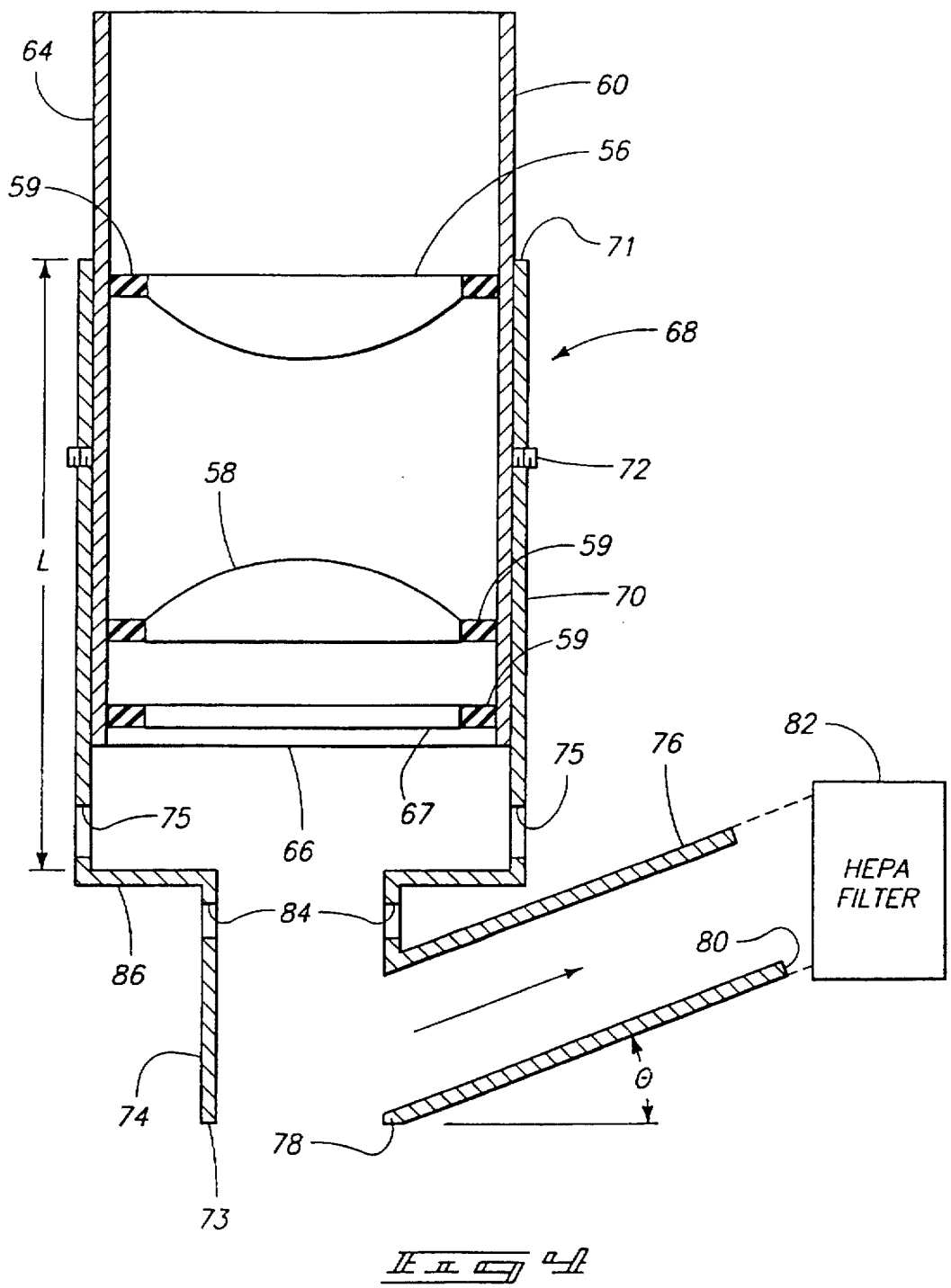

LASER ABLATION SYSTEM, AND METHOD OF DECONTAMINATING SURFACES

CONTRACTUAL ORIGIN OF THE INVENTION

The United States Government has rights in this invention disclosed under Contract Number DE-AC07-94ID13223 with Lockheed Idaho Technologies Company.

TECHNICAL FIELD

The invention relates to laser ablation, and to methods of decontamination using laser ablation.

BACKGROUND OF THE INVENTION

In the past, techniques such as abrasive grit blasting and chemical processes have been used to remove oxide films or paint on surfaces that may contain hazardous contaminants or radioactive contamination. These techniques typically generate a secondary waste or use chemicals that are hazardous to personnel and the environment. Environmental regulations have been put in place that restrict the use of hazardous chemicals and high waste disposal costs have placed an emphasis on minimizing the amount of secondary waste that is generated during contaminant removal.

Laser light ablation is a process of removing surface material by using a high intensity laser beam to irradiate the surface material. When a focused laser beam irradiates a solid surface, a complicated interaction between the solid and the laser beam occurs. If the power density of the focused laser beam is high enough, the absorption of the laser beam on the solid surface will create a plasma plume and shock waves that will eject the material into the surrounding environment.

FIG. 1 illustrates the process of laser ablation. A laser 10 produces a beam 12 which is directed through a focusing lens 14 to a surface 16 that is to be decontaminated. A plasma plume 18 is created and material 20 is ejected from the surface 16.

Continuous wave (CW) or long pulse width lasers produce excessive material melting and sparking which causes the debris to be scattered over a large area. Melting during surface decontamination could cause serious problems by driving contaminants into the bulk of the material.

For applications that require the laser light ablation cleaning process to be conducted in a location that is not in "line-of site" of the laser head, a sophisticated robotically controlled mirror and lens beam delivery system is normally required. This requires extensive system setup time to ensure proper alignment of the optics and may result in significant power losses due to the attenuation of the optics. For example, decontamination using a Nd (Neodymium) YAG (Yttrium Aluminum Garnet) pulsed laser is disclosed in European Patent Application Publication No. 0 091 646, filed by Westinghouse Electric Corporation, published Oct. 0,0190,646, which is incorporated by reference. European Patent Application Publication No. 0,091,646 discloses reflecting the laser beam from a reflective surface for directing the reflected laser beam to inaccessible areas of the component to be decontaminated.

Gas environment also plays an important role in laser light ablation. When cover gases are present, lower ablation efficiency is observed due to gas breakdown caused by the high power density of the laser beam at its focal plane. A highly ionized plasma is formed above the surface. The plasma absorbs a large fraction of the laser energy and prevents the laser photons from reaching the surface to be ablated. The magnitude of the laser energy loss depends upon the gas pressure, the ionization potential of the cover gas and the laser power density. At lower gas pressures, the plasma density decreases and more of the laser photons penetrate the plasma to reach the surface to be ablated. When operating in a normal air environment, if the laser power density at the surface is increased, a point is reached where only a small fraction of the added laser energy reaches the material surface. Once this threshold is exceeded, there is little improvement of the ablation rate with increased laser power density. The amount of material ablated by a pulsed laser is linearly related to the total number of laser pulses that strike the surface. Therefore, a high repetition rate moderated power laser provides a better cleaning rate than a high power, low repetition rate laser of the same average power.

BRIEF DESCRIPTION OF THE DRAWINGS

Preferred embodiments of the invention are described below with reference to the accompanying drawings, which are briefly described below.

FIG. 3 is a side elevational view of a laser ablation system embodying the invention.

FIG. 4 is an enlarged section view of a particle collection cell included in the laser ablation system of FIG. 3.

SUMMARY OF THE INVENTION

The invention provides a laser ablation system comprising a Nd:YAG laser head; an acousto-optic Q-switch coupled to the laser head and providing a laser output; a flexible fiber optic cable having a first end optically coupled to the laser output and having a second end transmitting laser light; an output optics assembly including an output coupler having a first end connected to the second end of the fiber optic cable and having a second end , the output coupler supporting a collimating lens and supporting a focusing lens downstream of the collimating lens; and a particle collection cell telescoped to the second end of the output optics assembly, the particle collection cell including a nozzle through which laser light passes.

One aspect of the invention provides a laser ablation system comprising a laser head providing a laser output; a flexible fiber optic cable optically coupled to the laser output and transmitting laser light; an output optics assembly including a nozzle through which laser light passes; an exhaust tube in communication with the nozzle; and a blower generating a vacuum on the exhaust tube.

One aspect of the invention provides a method of decontaminating a surface comprising the following steps: providing an acousto-optic, Q-switched Nd:YAG laser light ablation system having a fiber optically coupled output optics assembly; and operating the laser light ablation system to produce an irradiance greater than $1 \times 10^7$ W/cm$^2$, and a pulse width between 80 and 170 ns.

The laser ablation system is used to ablate or remove contaminated material without generating a large quantity of secondary waste. The ablated contaminants are collected via a particle collection cell and a HEPA (High Efficiency Particulate Air filter) filtered blower system.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Experimental Research and Development

To develop a fiber optically delivered laser light ablation system, research was conducted to determine the minimum pulse width and irradiance (or power intensity in $W/cm^2$) to achieve efficient surface cleaning and not cause gas breakdown in a normal air environment. Material removal varies sublinearly with the laser power density and linearly with the laser repetition rate. Therefore, the optimal laser will have sufficient power density after focusing to ablate material while having as high a repetition rate as possible (as long as the repetition rate does not cause the pulse width of the laser to increase to greater than 200 ns). The inventors have determined that an irradiance of greater than $1 \times 10^7$ $W/cm^2$ and a pulse width less than 150 ns at a 1064 nm wavelength is required for efficient ablation of stainless steel surface material.

Figure 1:
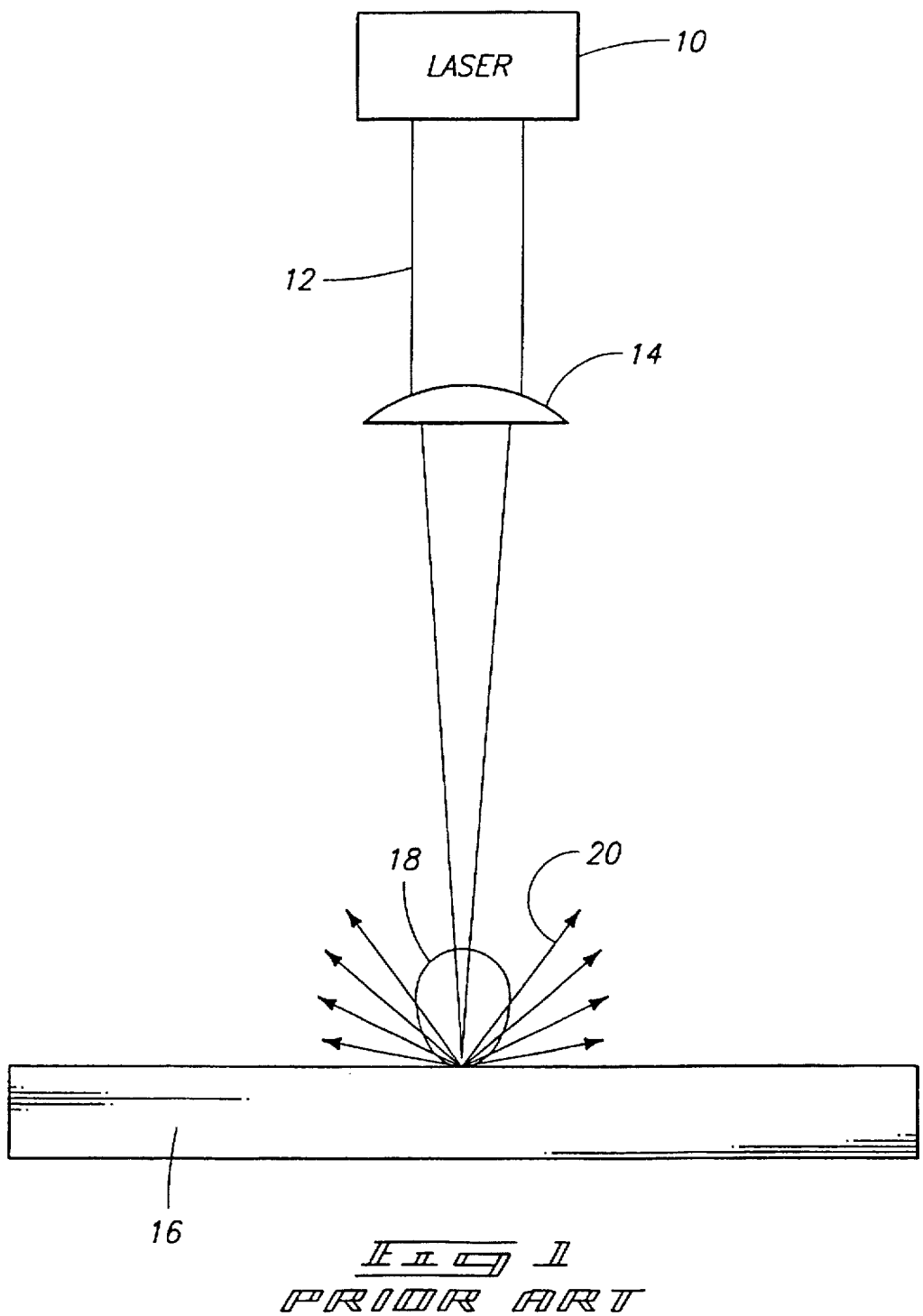
FIG. 1 is a schematic illustration of a prior art laser ablation method and apparatus.
Figure 2:
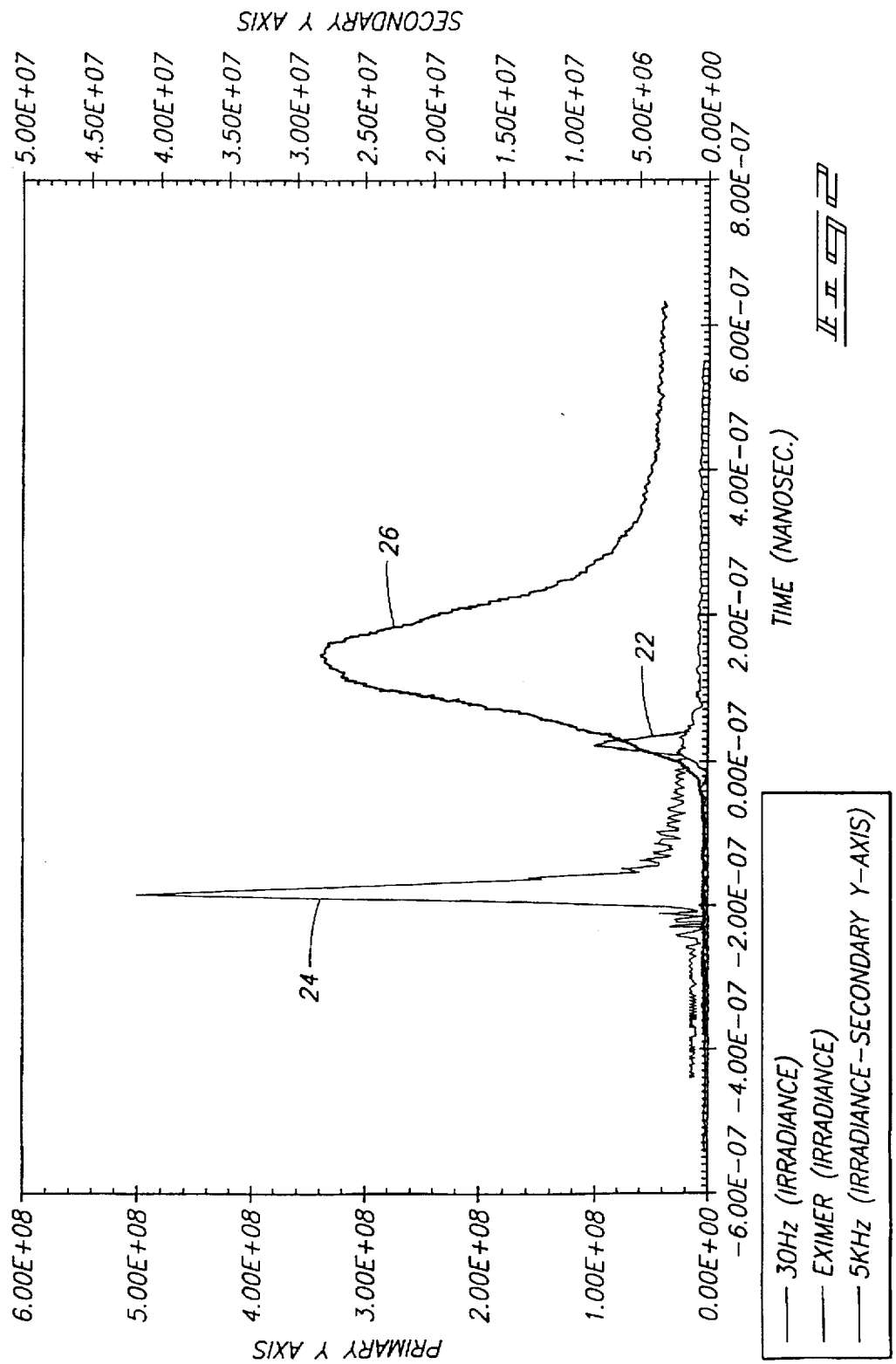
FIG. 2 is a graph showing the difference in pulse width and power density between an excimer laser, an electro-optic Q-switched Nd:YAG laser, and an acousto-optic Q-switched Nd:YAG laser.

FIG. 2 is a graph showing the difference in pulse width and power density between an excimer laser (curve 22, use primary Y-axis), an electro-optic Q-switched Nd:YAG laser (curve 24, use primary Y-axis), and an acousto-optic Q-switched Nd:YAG laser (curve 26, use secondary Y-axis). As will be described below, the acousto-optic Q-switched Nd:YAG laser (curve 26 in FIG. 2) is employed in the preferred embodiment of the invention.

To test the efficiency of laser light ablation systems, SIMCON (simulated contamination) coupons were used as workpieces.

Two types of SIMCON coupons were used for these tests. SIMCON I coupons, which simulate "loose" or surface contamination, were prepared. The SIMCON I coupons comprised known quantities of Cs and Zr nitrate salts that were dried on the surface of one inch diameter stainless steel coupons. SIMCON II coupons, which simulate "fixed" contamination, were also prepared. The SIMCON II coupons comprised known quantities of Cs and Zr nitrate salts that were baked on one inch diameter stainless steel coupons at high temperature for a period of 24 hours. SIMCON I coupons comprise a coating that is easily removed. SIMCON II coupons, on the other hand, comprise a tenacious coating that is difficult to remove. X-ray fluorescence spectrometry was used to determine the respective amounts of Cs and Zr on the surface of the coupons both before and after laser ablation experiments were performed. These SIMCON coupons are a good representation of the types of contamination that can be found in an environment that may contain radioactive contamination.

In these experiments, for both excimer and electro-optic, Q-switched, Nd:YAG lasers, a series of mirrors and lenses were used to transmit or reflect the laser beam to the item being cleaned. In most of the experiments, the laser beam was held in a stationary position while the material was rastered, under the laser beam, by a worktable under computer control. This beam delivery method proved to be very effective in a laboratory setup and applicable in certain field applications.

However, for applications that require the laser light ablation cleaning process to be conducted in a location that is not in "line-of site" of the laser head, a sophisticated robotically controlled mirror and lens beam delivery system could be required. This requires extensive system setup time to ensure proper alignment of the optics and may result in significant power losses due to the attenuation of the optics.

The inventors have solved this problem by providing a fiber optic beam delivery system for use in laser light ablation. A fiber optic beam delivery system has several advantages over a typical mirror and lens beam delivery system. The fiber optic beam delivery system of the invention allows the expensive laser head and electronics to remain completely isolated from the contaminated environment. The flexible fiber optic cable can bend around corners, over obstructions and can thus be used to perform the laser light ablation cleaning process in a remote location without requiring sophisticated robotics to maintain alignment of mirror and lens optics.

A problem with fiber optic beam delivery systems is that it is difficult to provide a sufficiently high power density for effective ablation without exceeding the energy threshold capabilities of the fiber optic cable. The inventors performed various experiments to develop an effective laser ablation system including a fiber optic beam delivery system.

The Nd:YAG laser operates at a wavelength that can be transmitted fiber optically. There are commercially available fiber optic Nd:YAG laser systems that operate in a CW (continuous wavelength) or pulsed mode. The inventors have found that Nd:YAG laser systems operating in the continuous wavelength mode are not amenable to surface decontamination laser ablation because they tend to melt underlying material.

The Nd:YAG laser systems operating in the pulsed mode have pulse widths that are in the millisecond range. The inventors have found that lasers operating with millisecond pulse widths are not effective at laser ablation due to excessive material heating. On the other hand, the inventors have found that with a Nd:YAG laser, a Q-switching mechanism provides an appropriate combination of irradiance (or power intensity) and pulse width to perform laser ablation.

Fiber optic compatibility tests were performed with the electro-optic, Q-switched, Nd:YAG laser. For these tests the laser was operated at repetition rate of 30 Hz with a 10 ns pulse width at a 1060 nm wavelength. A 1 mm laser compatible optical fiber was tested with this setup. The fiber was designed to transmit up to 500 mJ/pulse of Q-switched Nd:YAG output. For a first set of tests, the fibers were polished by hand. A second series of tests were conducted to determine if fibers prepared by a commercial vendor would provide increased power transmission. The commercial vendor's preparation included annealing the fibers and special end polishing and cleaning. Additional modifications were made to position the focal point of the laser inside the fiber including use of a 0.75 mm aperture for full containment of the beam inside the fiber. During these tests with the electro-optic, Q-switched, Nd:YAG laser, 40 mJ/pulse of laser energy was transmitted through the fiber optic cable, which was far less than the 190 mJ capability of the electro-optic, Q-switched, Nd:YAG laser. Attempts to transmit greater than 40 mJ/pulse with a 10 ns pulse width produced an irradiance (or power intensity) level that caused breakdown of the optical fiber by exceeding the energy threshold of the optical fiber. The fiber failed after minutes of operation.

PREFERRED EMBODIMENTS

After conducting the above described research, the inventors have developed a preferred laser ablation system 30.

shown in FIG. 3, and have determined an appropriate pulse width and irradiance to achieve efficient cleaning of a surface of workpiece 31 with minimum gas breakdown in a normal air environment.

A high repetition rate, acousto-optic, Q-switched, fiber optically delivered, Nd:YAG, laser light ablation system was developed which provides for efficient ablation of surface material. The embodiment shown in FIG. 3 comprises the combination of: 1) A high power, high repetition rate, acousto-optic, Q-switched, Nd:YAG laser with 2) A fiber optic beam delivery system, in conjunction with 3) A particle collection cell and filtration system. This embodiment is operated with a proper combination of wavelength, pulse width, irradiance and particulate collection for efficient laser light ablation or laser surface decontamination of a workpiece.

The laser ablation system 30 includes a Nd:YAG laser head 32. The laser head 32 includes a Nd:YAG crystal, a flash lamp, and a laser cavity. The laser head 32 pumps optical energy and emits photons. While other models could be employed, in the illustrated embodiment the laser head 32 is a 250 W laser head sold under part number 405 Q by U.S. Laser and that operates at 1064 nm wavelength. This is a multimode laser head with a divergence (full angle) of 3.8 milli-radians @ 230 watts (CW) and a shot-to-shot stability of ±5%.

The laser ablation system 30 further includes an acousto-optic Q-switch having components 34a and 34b coupled on either side of the laser head 32. The Q-switch allows energy to be built up inside the laser cavity of the laser head 32. The Q-switching repetition rate is variable between 100 Hz and 13 kHz. The difference between acousto-optic Q-switches and electro-optic Q-switches is that a longer laser pulse width can be obtained using an acousto-optic Q-switch. An electro-optic Q-switch is analogous to a small shutter; in contrast, an acousto-optic Q-switch comprises two RF (radio frequency) modulators that bend the laser beam. While other models could be employed, in the illustrated embodiment the Q-switch 34a, 34b is sold under part number 1011-2 by U.S. Laser.

The laser ablation system 30 further includes front and rear mirror assemblies 36 and 38 bracketing the Q-switch laser head. While other models could be employed, in the illustrated embodiment the front mirror assembly 36 is sold under part number 3406 by U.S. Laser, and the rear mirror assembly 38 is sold under part number 3401 by U.S. Laser. The rear mirror assembly 38 includes a mirror that is approximately 100% reflective, and the front mirror assembly 36 includes a mirror that is approximately 80% reflective, and photons bounce back and forth between the front and rear mirror assemblies so that high energy photons pass through the front mirror assembly 36 in the direction away from the laser head 32 in the form of a laser beam.

The laser ablation system 30 further comprises a safety shutter 40 immediately adjacent to the front mirror assembly 36, and between the mirror assembly 36 and the Q-switch component 34a. While other models could be employed, in the illustrated embodiment the safety shutter 40 is sold by U.S. Laser.

The laser ablation system 30 further comprises a fiber optic input coupler assembly 42. The input coupler assembly 42 receives the laser beam output of the front mirror assembly 36 and delivers it to a fiber optic cable described below. While other models could be employed, in the illustrated embodiment the input coupler assembly 42 is sold under part number 3302-8 by U.S. Laser.

The laser ablation system 30 further comprises a power meter 44 between the front mirror assembly 36 and the input coupler assembly 42. The power meter 44 measures the power (in Watts) of the laser beam passing therethrough.

The laser ablation system 30 further comprises a helium-neon laser 46. The helium-neon laser 46 provides a visible laser beam which is used to align the previously described components 32, 34, 36, 38, 40, 42, and 44 and which passes through the fiber optic cable described below to provide a visual indication of the location of the laser output of the laser ablation system 30. This is useful because the laser beam developed by the laser head 32 is infra-red and cannot be seen. While other models could be employed, in the illustrated embodiment the helium-neon laser 46 is sold by U.S. Laser.

The laser ablation system 30 further comprises a closed-loop recirculating chiller system to cool the laser head 32, the Q-switch components 34a and 34b, and the power meter 44.

The laser ablation system 30 further comprises a rail assembly 47 on which the components 32, 34a, 34b, 36, 38, 42, 44, and 46 are mounted. While other models could be employed, in the illustrated embodiment the rail assembly 47 is sold by U.S. Laser.

The laser ablation system 30 further comprises a fiber optic cable 48 conducting the laser beam from the coupler assembly 42. In the illustrated embodiment, the fiber optic cable 48 is an armor coiled, metal jacketed, step-indexed fused silica fiber optic cable that has a core diameter of 1000 μm and an energy threshold of $1 \times 10^8$ W/cm$^2$.

The laser ablation system 30 further comprises connectors 50 and 52 on opposite ends of the fiber optic cable 48. While other models could be employed, in the illustrated embodiment the connectors 50 and 52 are Mitsubishi D80-HA mechanical fiber optic connectors. One connector 50 is used to connect the fiber optic cable 48 to the input coupler 42.

The laser ablation system 30 further comprises an output optics assembly 54 connected to the fiber optic cable 48 by the connector 52. The output optics assembly 54 comprises a collimating lens 56, and a focusing lens 58 downstream of the collimating lens 56. Both the collimating lens 56 and the focusing lens 58 are formed of high grade, fused silica with an anti-reflection coating at 1064 nm. In one embodiment, the focusing lens 58 has a focal length between 25 mm and 200 mm (@ 1064 nm). In another embodiment, the focusing lens 58 is selected from a group consisting of focusing lenses having focal lengths of 100 mm, 75 mm, and 57 mm (@ 1064 nm). In the illustrated embodiment, the focusing lens 58 is a 57 mm focal length (@ 1064 nm) plano-convex lens. The output optics assembly 54 comprises an output coupler 60 encasing and supporting the collimating lens 56 and the focusing lens 58. More particularly, the output coupler 60 has an upper end 62 connected to the connector 52, and an elongated hollow tubular portion 64 below the upper end 62, which tubular portion 64 supports the collimating lens 56 and the focusing lens 58. More particularly, the output optics assembly 54 further comprises spaced apart snap on rings 59 in the tubular portion 64, which rings respectively support the collimating lens 56 and the focusing lens 58. The tubular portion 64 includes a lower end 66 supporting and closed off by a quartz cover 67, downstream of the collimating lens 56 and the focusing lens 58. The quartz cover 67 provides a protective window to prevent dust and debris from coating the collimating lens 56 and the focusing lens 58. While other models could be employed, in the illustrated embodiment the output optics assembly comprises components sold under U.S. Laser part numbers 3303-9 and 3304-8 modified to substitute the above described 57 mm focal length focusing lens 58 for the stock focusing lens provided by U.S. Laser.

The output optics assembly 54 further comprises a particle collection cell 68 which is used to collect ablated particles and to prevent them from redepositing on surrounding surfaces of the workpiece. The particle collection cell 68 includes a hollow tubular portion 70 having an open end 71, and a bottom 86. The particle collection cell 68 telescopically receives a portion of the output coupler 60 through the open end 71. The particle collection cell 68 includes angularly spaced apart set screws 72 securing the particle collection cell 68 to the output coupler 60 such that the lower end 66 of the output coupler extends substantially (e.g., more than half way), into the particle collection cell 68. In the illustrated embodiment, the focusing lens 58 is located below the set screws 72.

The particle collection cell 68 further includes a hollow tubular nozzle 74 coaxial with the tubular portion 70, having a smaller diameter than the tubular portion 70, and extending from the bottom 86 of the tubular portion 70. Light is emitted out of the nozzle 74 for ablating a workpiece, and ablated particles are sucked into the nozzle 74. The nozzle 74 has a tip 73 which faces the workpiece to be ablated.

A plurality of angularly spaced apart apertures 75 are provided through the tubular portion 70, between the lower end 66 of the output coupler 60 and the nozzle 74, to provide air flow across the protective quartz cover 67 to impede ablated particles from being deposited on the quartz cover 67. Degradation of performance would result if particles accumulated on the quartz cover 67.

The particle collection cell 68 further includes a hollow exhaust tube 76 which has an inlet that intersects, and that is in communication with, the nozzle 74. The exhaust tube 76 further includes an outlet 80 in fluid communication with a conventional HEPA filtered blower system 82, which draws air (creates a vacuum) through exhaust tube 76 in the direction of the arrow at a rate adjustable between 20 and 90 cfm. The HEPA filtration system 82 has a 99.99% filtration efficiency for 3 μm particles. The entrance of the exhaust tube 76 is approximately 40 mm from the surface being ablated. A flexible hose can be attached between the exhaust tube 76 and the HEPA filtered blower system 82. In the illustrated embodiment, the exhaust tube 76 is angled away from the plane containing the tip 73 by an angle θ.

An additional plurality of angularly spaced apertures 84 are provided through the output nozzle 74, between the tubular portion 70 and the exhaust tube 76.

In the illustrated embodiment, the particle collection cell 68 is formed of a material that is readily decontaminated if exposed to radiation. Preferably, the particle collection cell material also has a high resistance to acids. In one embodiment, the particle collection cell 68 is formed of brass. In another embodiment, the particle collection cell 68 is formed of stainless steel. Various dimensional relationships are possible for the various components of the particle collection cell 68. However, to better enable one of ordinary skill in the art to practice the invention without undue experimentation, various dimensions will be given. These dimensions are given by way of example only. In the illustrated embodiment, the tubular portion 70 of the particle collection cell 68 has an axial extent L of 2.000 inches, and an inner diameter of 1.500 inches. There are four of the angularly spaced set screws 74, angularly spaced apart from one another in 90° intervals. The set screws 74 each have a center located 0.625 inch from the open end 71 of the particle collection cell 68. The walls of the particle collection cell 68 are $\frac{1}{16}$ inch thick. There are 12 of the holes 75 angularly spaced apart from one another in 30° intervals. The holes 75 each have a $\frac{3}{16}$ inch diameter, and each have a center located 0.1875 inch from the bottom 86 of the tubular portion 70. There are 4 of the holes 84 angularly spaced apart from one another in 90° intervals. The holes 84 each have a $\frac{1}{8}$ inch diameter, and each have a center located 0.750 inch from the tip 73. The angle θ is 20°. The distance from the tip 73 to the bottom 86 is 0.875 inch. The outer diameter of the nozzle 74 is 0.750 inch. The inner diameter of the nozzle 74 is 0.625 inch. The outer diameter of the exhaust tube 76 is 0.625 inch. These dimensions are given by way of example only, other dimensions can be employed.

The system 30 optionally further includes a robotic positioning system 88 for moving (rastering) the workpiece 31 relative to the output optics 54. The robotic positioning system 88 includes either a conventional robotic arm supporting and moving (baste ring) the output optic s 54, or a movable worktable 90 on which the workpiece 31 is supported, or both.

The operating parameters of the illustrated embodiment will be described, reference being made to Table 1.

TABLE 1

| Operating Parameters. | | |
|---|---|---|
| PARAMETERS | RANGE | OPTIMUM |
| Raster speed. | >5 cm/s (x-direction) | ≧10 cm/s (x-direction) |
| Step index. | 0.5 mm (y-direction) | 0.5 mm (y-direction) |
| Number of scans. | ≧1 | 2* |
| Maximum focal range (How far above or below focal point and still have efficient ablation). | ±2 mm from focal point | 0 (at focal point) |
| Maximum offset angle (± degrees from perpendicular). | ±20° from perpendicular | 0 (perpendicular to surface) |
| Optimum repetition rate for the laser (this corresponds with optimum pulse width). | 3–7 KHz | 5 KHz (136 ns pulse width) |
| Spot size. | ~1.0 mm | ~1.0 mm |
| Power level. | (Input Only) | @ 5 KHz |
| Input to fiber optics. | 110–200 W | 165 W (input) |
| Output from fiber optics. | | 150 W (output) |
| Irradiance (or power intensity in W/cm$^2$) | $1 \times 10^7$–$1 \times 10^8$ W/cm$^2$ | ~2.7 × 10$^7$ W/cm$^2$ |

*(for a total cleaning time of 24 sec to clean 1 surface of a 1 inch diameter stainless steel coupon)

In the illustrated embodiment, the laser head 32 includes a power supply having a control unit. In the illustrated embodiment, power level is left at a maximum, and repetition rate is adjusted to an optimum value using the control unit. More particularly, as shown in Table 1, in the preferred embodiment, the power output level is 150 Watts (W), and the repetition rate is between 3 and 7 kiloHertz (kHz). In a more preferred embodiment, repetition rate is between 4 and 6 kHz and power input to the fiber optic cable 48 is between 125 and 185 W. In a most preferred embodiment, the repetition rate is 5 kHz and power output from the fiber optic cable 48 is 150 W.

Pulse width is a function of repetition rate. If the pulse width is too small, the fiber optic cable 48 will be damaged. In a preferred embodiment, the pulse width is between 80 and 170 nanoseconds (ns). In a more preferred embodiment, the pulse width is between 100 and 150 ns. In a most preferred embodiment, the pulse width is 136 ns, which corresponds to a repetition rate of 5 kHz.

In one embodiment, the robotic positioning system 88 rasters (moves) the workpiece 31 relative to the output optics assembly 54 in an x-direction (left and right direction in FIG. 3) at a speed between 5 and 20 centimeters per second (cm/s). In another embodiment, the robotic positioning system 88 rasters the workpiece 31 relative to the output optics assembly 54 in the x-direction at a speed greater than 8 cm/s. In a most preferred embodiment, the robotic positioning system 88 rasters the workpiece 31 relative to the output optics assembly 54 in the x-direction at a speed of at least 10 cm/s.

In the preferred embodiment, the robotic positioning system 88 steps (moves) the workpiece 31 relative to the output optics assembly 54 in a y-direction (into and out of the page in FIG. 3) in increments of 0.5 millimeters (mm).

In the preferred embodiment, the maximum number of scans (left and right in FIG. 3) per step is at least one. In a more preferred embodiment, the number of scans per step is two. This provides for a optimum combination of ablation effectiveness and speed.

The focal length selected for the focusing lens 58 determines the location of the focal point of the output of the optics 54. In the preferred embodiment, the maximum focal range (distance the top of the workpiece is above or below the focal point in FIG. 3) is ±2 mm. In a more preferred embodiment, the maximum focal range is ±1 mm. In a most preferred embodiment, the maximum focal range is 0 mm (the surface to be ablated is at the focal point).

In the preferred embodiment, the spot size (the size of the spot output by the focusing lens 58 that intersects the surface to be ablated of the workpiece 31) is between 0 and 2 mm. In a more preferred embodiment, the spot size is between 0.5 and 1.5 mm. In a most preferred embodiment, the spot size is 1 mm.

In the preferred embodiment, the maximum offset angle (the angle at which the output optics assembly 54 is offset from being perpendicular to the workpiece 31) is ±20° from perpendicular. In a more preferred embodiment, the maximum offset angle is ±10° from perpendicular. In a most preferred embodiment (shown in FIG. 3), the maximum offset angle is 0° (the output optics assembly 54 is perpendicular to the surface to be ablated of the workpiece 31).

Irradiance (power intensity) is a function of repetition rate and the focusing lens 58. More particularly, irradiance is energy per pulse divided by pulse width per spot size [(energy/pulse)/(pulse width×area of spot size)]. In the preferred embodiment, irradiance is greater than $1 \times 10^7$ Watts per square centimeter ($W/cm^2$). In a more preferred embodiment, irradiance is between $2.2 \times 10^7$ and $3.2 \times 10^7$ $W/cm^2$. In a most preferred embodiment, irradiance is $2.7 \times 10^7$ $W/cm^2$.

Experimental Testing of Preferred Embodiment-Efficiency of Cleaning

Tests show that when SIMCON 2 coupons were cleaned using the optimum operating parameters an average of 100% of the Cs and 95.14% of the Zr simulated contaminants were removed. When SIMCON 2 Coupons were cleaned within the operating range, an average of 99.43% of the Cs and 93.32% of the Zr simulated contaminants were removed.

Because this system was developed for decontamination of hot cells and hot cell equipment, radiation exposure tests were conducted on the fiber optic cable 48 and the focusing lens 58. Three 1 meter fiber optic cables 48 were prepared and tested to determine the power transmission of the fibers prior to irradiation. These fiber optic cables and the focusing lens 58 were then exposed to a high energy gamma radiation source. The three 1 meter fiber optic cables were then tested to determine the power transmission of the fiber optic cables after irradiation. The results of these tests can be found in Table 2. No significant degradation of the fiber optic cables was observed.

TABLE 2

Effects of Radiation Exposure on Fiber Optic Laser Transmission

| SAMPLE | Exposure to 26,496 R/hr source (min.) | Equivalent Exposure (days in a 100 R/hr hot cell) | Total Dose to fiber (R) | Pre-Irradiation Output power (W) | Post-Irradiation Output Power (W) |
|---|---|---|---|---|---|
| A | 38.1 | 7 | 16,800 | 154 | 153 |
| B | 76.2 | 14 | 33,600 | 154 | 153 |
| C | 152.4 | 28 | 67,200 | 154 | 153 |

Additional tests were conducted utilizing radioactively contaminated material, these samples were called REALCON 1. This material was used in a calcining facility at the Idaho Chemical Processing Plant and had previously been chemically decontaminated but still retained residual contamination. These samples are made of Stellite (also known as Haynes 25), which is an extremely hard and durable material composed primarily of Cobalt. An attempt had previously been made to clean these samples, using an excimer laser, without success. For this experiment, only the flat surface of the sample was cleaned. The initial activity for the sample was 4500 cpm (counts per minute). Using the laser's optimum operating parameters this sample was cleaned. After the first pass, the activity dropped to 2000 cpm. The activity continued to decrease and reached 1300 cpm after the fourth pass. No further reduction of activity was noted after additional surface scans. This was most likely due to measurement of background activity from the surfaces that were not cleaned or activity in the bulk of the material. Nevertheless the laser light ablation system of the preferred embodiment clearly succeeded in reducing the contamination levels of one of the hardest known alloys. Approximately 80% of the contamination, on the cleaned surface, was removed on the first pass of the laser beam.

Thus, a system has been disclosed for efficient laser ablation.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A laser ablation system for conducting ablation in an ambient atmosphere, comprising:
    a Nd:YAG laser head providing a laser output;
    a flexible fiber optic cable optically coupled to the laser output to transmit laser light;
    an acousto-optic Q-switch coupled to the laser head upstream of the fiber optic cable to switch the laser output of the laser head to provide a controlled laser output to the fiber optic cable with a repetition rate between 3 and 7 kHz, a pulse width between 100 and 140 ns, and an irradiance greater than $1\times10^7$ w/cm$^2$;

an output optics assembly including a nozzle through which laser light passes;

an exhaust tube in communication with the nozzle; and a blower generating a vacuum on the exhaust tube.

2. A laser ablation system in accordance with claim 1 and further comprising a filter in fluid communication with the blower.

3. A laser ablation system in accordance with claim 1 wherein the blower draws air through the exhaust tube, in the direction away from the nozzle, at a rate between 20 and 90 cubic feet per minute.

4. A laser ablation system in accordance with claim 1 wherein the output optics assembly comprises a collimating lens, and a focusing lens downstream of the collimating lens.

5. A laser ablation system in accordance with claim 4 wherein the focusing lens is a 57 mm focal length convex lens.

6. A laser ablation system in accordance with claim 1 wherein the controlled laser output has a repetition rate between 4 and 6 kHz.

7. A laser ablation system in accordance with claim 1 wherein the controlled laser output has a repetition rate of 5 kHz.

8. A laser ablation system in accordance with claim 1 wherein the controlled laser output has a pulse width of 136 ns.

9. A laser ablation system in accordance with claim 1 wherein the controlled laser output has an irradiance between $2.2\times10^7$ and $3.2\times10^7$ W/cm$^2$.

10. A laser ablation system in accordance with claim 1 wherein the controlled laser output has an irradiance of $2.7\times10^7$ W/cm$^2$.

11. A laser ablation system for conducting ablation in an ambient atmosphere, comprising:

a Nd:YAG laser head;

an acousto-optic Q-switch coupled to the laser head and providing a controlled laser output, wherein the controlled laser output has a repetition rate between 3 and 7 kHz, has a pulse width between 100 and 140 ns, and has an irradiance greater than $1\times10^7$ W/cm$^2$;

a flexible fiber optic cable having a first end optically coupled to the laser output and receiving a power input above 110 W and having a second end transmitting laser light without being destroyed by the laser output; and an output optics assembly including an output coupler having a first end connected to the second end of the fiber optic cable and having a second end, the output coupler supporting a collimating lens and supporting a focusing lens downstream of the collimating lens.

12. A laser ablation system in accordance with claim 11 and further comprising a laser capable of emitting a visible laser beam oriented to transmit a laser beam through the laser head, the fiber optic cable, and the output optics assembly, whereby a visible laser beam is provided to assist in aligning the laser head, fiber optic cable, and output optics assembly, and to provide a visual indication of the location where laser ablation is taking place.

13. A laser ablation system in accordance with claim 11 and further comprising a helium-neon laser oriented to transmit a laser beam through the laser head, the fiber optic cable, and the output optics assembly.

14. A laser ablation system in accordance with claim 11 wherein the fiber optic cable is a metal jacketed fiber optic cable.

15. A laser ablation system in accordance with claim 11 wherein the fiber optic cable is an armor coiled, metal jacketed, step-indexed fused silica fiber optic cable that has a core diameter of 1000 µm and an energy threshold of $1\times10^8$ W/cm$^2$.

16. A laser ablation system in accordance with claim 11 and further comprising a window downstream of the focusing lens and shielding the focusing lens from ablated particles.

17. A laser ablation system in accordance with claim 16 and further comprising holes through the particle collection cell, transverse to the direction through which laser light passes, providing for air flow to impede ablated particles from settling on the window.

18. A laser ablation system in accordance with claim 11 and further comprising a robotic positioning system controllably moving the output optics assembly relative to a workpiece.

19. A laser ablation system in accordance with claim 18 wherein the robotic positioning system controllably moves the output optics assembly relative to a workpiece along a first direction at a speed between 5 and 20 cm/sec.

20. A laser ablation system in accordance with claim 18 wherein the robotic positioning system controllably moves the output optics assembly relative to a workpiece along a first direction at a speed greater than 8 cm/sec.

21. A laser ablation system in accordance with claim 18 wherein the robotic positioning system controllably moves the output optics assembly relative to a workpiece along a first direction at a speed of at least 10 cm/sec.

22. A laser ablation system in accordance with claim 20 wherein the robotic positioning system controllably moves the output optics assembly relative to a workpiece along a second direction, perpendicular to the first direction, in increments of 0.5 mm.

23. A laser ablation system in accordance with claim 22 wherein the robotic positioning system controllably moves the output optics assembly relative to a workpiece along the first direction more than once per step.

24. A laser ablation system in accordance with claim 18 wherein the output optics assembly produces a laser output having a focal point, and wherein the robotic positioning system locates the output optics assembly above a workpiece such that the workpiece is ±2 mm from the focal point.

25. A laser ablation system in accordance with claim 18 wherein the output optics assembly produces a laser output which has a spot size when the laser output intersects a workpiece, and wherein the robotic positioning system locates the output optics assembly above a workpiece such that the spot size is between 0 and 2 mm.

26. A laser ablation system in accordance with claim 18 wherein the output optics assembly produces a laser output which has a spot size when the laser output intersects a workpiece, and wherein the robotic positioning system locates the output optics assembly above a workpiece such that the spot size is between 0.5 and 1.5 mm.

27. A laser ablation system in accordance with claim 18 wherein the output optics assembly produces a laser output which has a spot size when the laser output intersects a workpiece, and wherein the robotic positioning system locates the output optics assembly above a workpiece such that the spot size is 1 mm.

28. A laser ablation system in accordance with claim 18 wherein the robotic positioning system angles the output optics assembly ±20° from perpendicular to a work piece.

29. A laser ablation system in accordance with claim 18 wherein the robotic positioning system angles the output optics assembly ±10° from perpendicular to a work piece.

30. A laser ablation system in accordance with claim 18 wherein the robotic positioning system angles the output optics assembly perpendicularly to a work piece.

31. A laser ablation system in accordance with claim 11 and further comprising a particle collection cell telescoped to the second end of the output optic s assembly, the particle collection cell including a nozzle through which laser light passes an exhaust tube in communication with the nozzle, and a blower generating a vacuum on the exhaust tube.

32. A method of decontaminating a surface comprising the following steps:

provensing a Nd:YAG laser light ablation system having a laser head, a fiber optically coupled output optics assembly coupled to the laser head, and an acousto-optic Q-switch to the laser head; and operating the laser light ablation system with a repetition rate between 3 and 7 kHz, a pulse width between 100 and 140 ns, and an irradiance greater than $1 \times 10^7$ w/cm$^2$.

33. A method in accordance with claim 32 wherein the laser light ablation system is operated with a repetition rate between 4 and 6 kHz.

34. A method in accordance with claim 32 wherein the laser light ablation system is operated with a repetition rate of 5 kHz.

35. A method in accordance with claim 32 and further comprising the step of rastering the output optics assembly relative to the surface along a first direction at a speed between 5 and 20 cm/sec.

36. A method in accordance with claim 35 and further comprising the step of moving the output optics assembly relative to the surface along a second direction, perpendicular to the first direction, in increments of 0.5 mm every certain number of rasters.

37. A method in accordance with claim 36 wherein the number of rasters per movement in the second direction is more than one.

38. A method in accordance with claim 32 and further comprising the step of rastering the Output optics assembly relative to the surface along a first direction at a speed greater than 8 cm/sec.

39. A method in accordance with claim 32 and further comprising the step of rastering the output optics assembly relative to the surface along a first direction at a speed of at least 10 cm/sec.

40. A method in accordance with claim 32 wherein the output optics assembly produces a laser output having a focal point, and further comprising the step of maintaining the surface within 2 mm from the focal point.

41. A method in accordance with claim 32 wherein the output optics assembly produces a laser output having a spot size, and further comprising the step of maintaining the spot size at a selected size between 0 and 2 mm.

42. A method in accordance with claim 32 wherein the output optics assembly produces a laser output having a spot size, and further comprising the step of maintaining the spot size at a selected size between 0.5 and 1.5 mm.

43. A method in accordance with claim 32 wherein the output optics assembly produces a laser output having a spot size, and further comprising the step of maintaining the spot size at 1 mm.

44. A method in accordance with claim 32 and further comprising the step of maintaining the output optics assembly at a selected angle ±20° from perpendicular to the surface.

45. A method in accordance with claim 32 and further comprising the step of maintaining the output optics assembly at a selected angle ±10° from perpendicular to the surface.

46. A method in accordance with claim 32 and further comprising the step of maintaining the output optics assembly perpendicularly to the surface.

47. A method in accordance with claim 32 wherein the operating step comprises the step of operating the laser light ablation system to produce an irradiance between $2.2 \times 10^7$ and $3.2 \times 10^7$ W/cm$^2$.

48. A method in accordance with claim 32 wherein the operating step comprises the step of operating the laser light ablation system to produce an irradiance of $2.7 \times 10^7$ W/cm$^2$.

49. A laser system comprising:

a Nd:YAG laser head providing a laser output;

a flexible fiber optic cable having a first end optically coupled to the laser output, and having a second end;

an acousto-optic Q-switch coupled between the laser head and the first end of the fiber optic cable and configured to switch the laser output of the laser head to provide a controlled laser output to the first end of the fiber optic cable with a repetition rate between 3 and 7 kHz, and an irradiance greater than $1 \times 10^7$ w/cm$^2$; and an output optics assembly optically coupled to the second end of the fiber optic cable.

* * * * *